INVENTORS
HOWARD L. FUNK
FRANK P. PALERMO
MORRIS KRAKINOWSKI
BY [signature]
ATTORNEY Nov. 26, 1968 H. L. FUNK ET AL 3,413,525

PATCH PANEL WIRING SYSTEM

Filed Jan. 17, 1966 10 Sheets-Sheet 2

Nov. 26, 1968 H. L. FUNK ET AL 3,413,525

PATCH PANEL WIRING SYSTEM

Filed Jan. 17, 1966 10 Sheets-Sheet 3

PATCH PANEL WIRING SYSTEM

Filed Jan. 17, 1966

Nov. 26, 1968 H. L. FUNK ET AL 3,413,525

PATCH PANEL WIRING SYSTEM

Filed Jan. 17, 1966 10 Sheets-Sheet 10

United States Patent Office 3,413,525

Patented Nov. 26, 1968

3,413,525

PATCH PANEL WIRING SYSTEM

Howard L. Funk, Yorktown Heights, Morris Krakinowski, Ossining, and Frank P. Palermo, Chappaqua, N.Y., assignors to International Business Machines Corporation, Armonk, N.Y., a corporation of New York Filed Jan. 17, 1966, Ser. No. 520,946
18 Claims. (Cl. 317—99)

ABSTRACT OF THE DISCLOSURE

A system for generating a desired wiring arrangement on a patch panel that comprises a plurality of switches or latches. As the wiring pattern is being traced on a format sheet, the switches under the sheet are caused to be energized as a pattern tracing stylus is passed over the sheet in accordance with the pattern. Alternatively, the energizing of the switches may be coded and stored as information on magnetic tape, for example, and, thereafter, the stored information can be decoded to cause the selective energization of the switches. The energized switches are then employed to control mechanical or electronic switches, the latter being utilized to interconnect an array of lines and elements into the desired wiring pattern.

This invention relates to a patch panel wiring system and more particularly to a system for wiring patch panels in a semiautomatic manner.

A patch panel may be employed in any situation where an interconnected electrical circuit is temporarily required. An example of such a situation is in circuit design, where a new circuit for performing a particular function is temporarily wired up on a patch panel so that it may be tested and its characteristics determined. Modifications may be wired into the circuit on the patch panel and the effect of these modifications determined. Another situation where patch panels are frequently employed is in the programming of analog computers. Here again, the desired circuit is drawn up by a circuit designer and is then wired up on a plug board which serves as the input to the analog computer.

The two-step operation of first designing the circuit and then wiring it into the plug board is time consuming and therefore expensive. Perhaps a more serious problem with this procedure is that it introduces a potential source of error in the conversion of the designed circuit into the patch panel wiring. It is therefore apparent that both the efficiency and accuracy of patch panel wiring could be substantially improved by a system which provided for automatically generating the patch panel wiring as the circuit to be wired is being drawn.

It is therefore a primary object of this invention to provide an improved patch-panel wiring system.

A more specific object of this invention is to provide a patch panel wiring system which is faster and more efficient than those presently in existence.

Another object of this invention is to provide a patch panel wiring system which eliminates the potential source of error introduced when the circuit design is manually wired into the patch panel.

A feature of this invention is the provision of a semi-automatic patch panel wiring system.

A more specific feature of this invention is the provision of a system which permits the patch panel to be automatcally wired as the circuit to be wired is being drawn.

In accordance with these objects this invention provides a system for generating a desired wiring pattern on a patch panel, which includes a plurality of latching devices. As the desired wiring pattern is being drawn, selected ones of the latching devices are latched. This may, for example, be accomplished by positioning switching devices under the sheet on which the circuit is being drawn and causing the switching devices to be energized as the stylus used to draw the circuit passes over them. In the alternative, the energizing of the switching devices may be coded and stored, as for example on magnetic tape, and the stored information decoded at a later time to cause the selective latching of the latching devices. The latched latching devices are then used to control mechanical or electronic switches, or similar devices which are used to interconnect an array of lines and elements into the desired wiring pattern.

The foregoing and other objects, features and advantages of the invention will be apparent from the following more particular description of a preferred embodiment of the invention as illustrated in the accompanying drawings.

In the drawings:

FIG. 1 is a diagram illustrating how FIGS. 1A–1B are to be combined to form a diagram of a sheet on which the desired wiring pattern may be drawn.

FIGS. 1A–1B, when combined, form a diagram of a sheet on which the desired wiring pattern may be drawn. This diagram includes the positions of switches used to detect the wiring pattern and also shows an illustrative wiring pattern.

FIG. 2 is a diagram illustrating how FIGS. 2A–2B are combined to form a diagram of a patch panel suitable for use in this invention.

FIGS. 2A–2B, when combined, form a diagram of a patch panel suitable for use in this invention.

FIG. 3 is a diagram illustrating how FIGS. 3A–3E are combined to form a composite semiblock diagram of the latch energizing circuits of this invention.

FIGS. 3A–3E, when combined, form a composite semiblock diagram of the latch energizing circuits of this invention.

Figures 1, 1A:
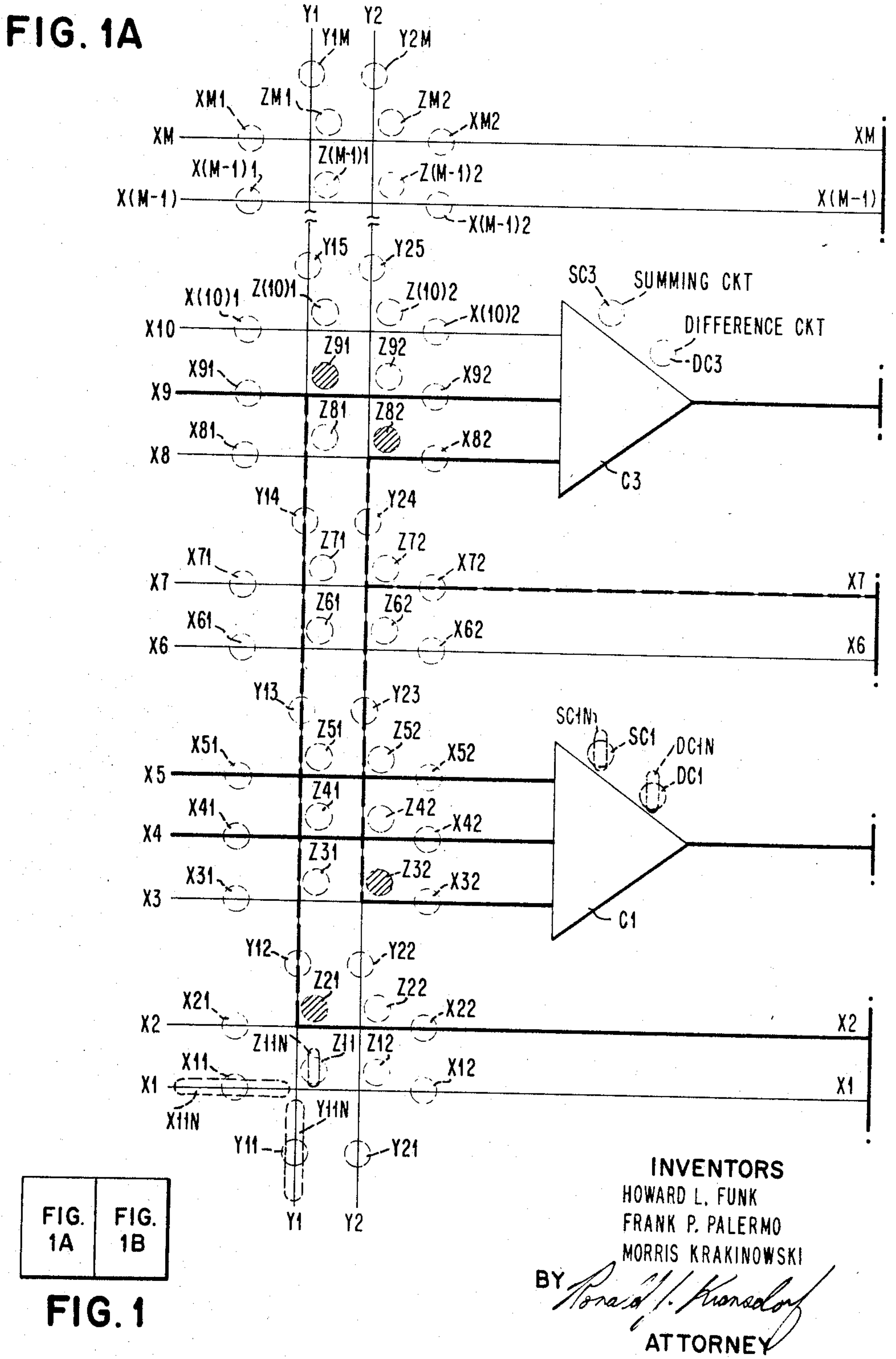
Figure 1B:
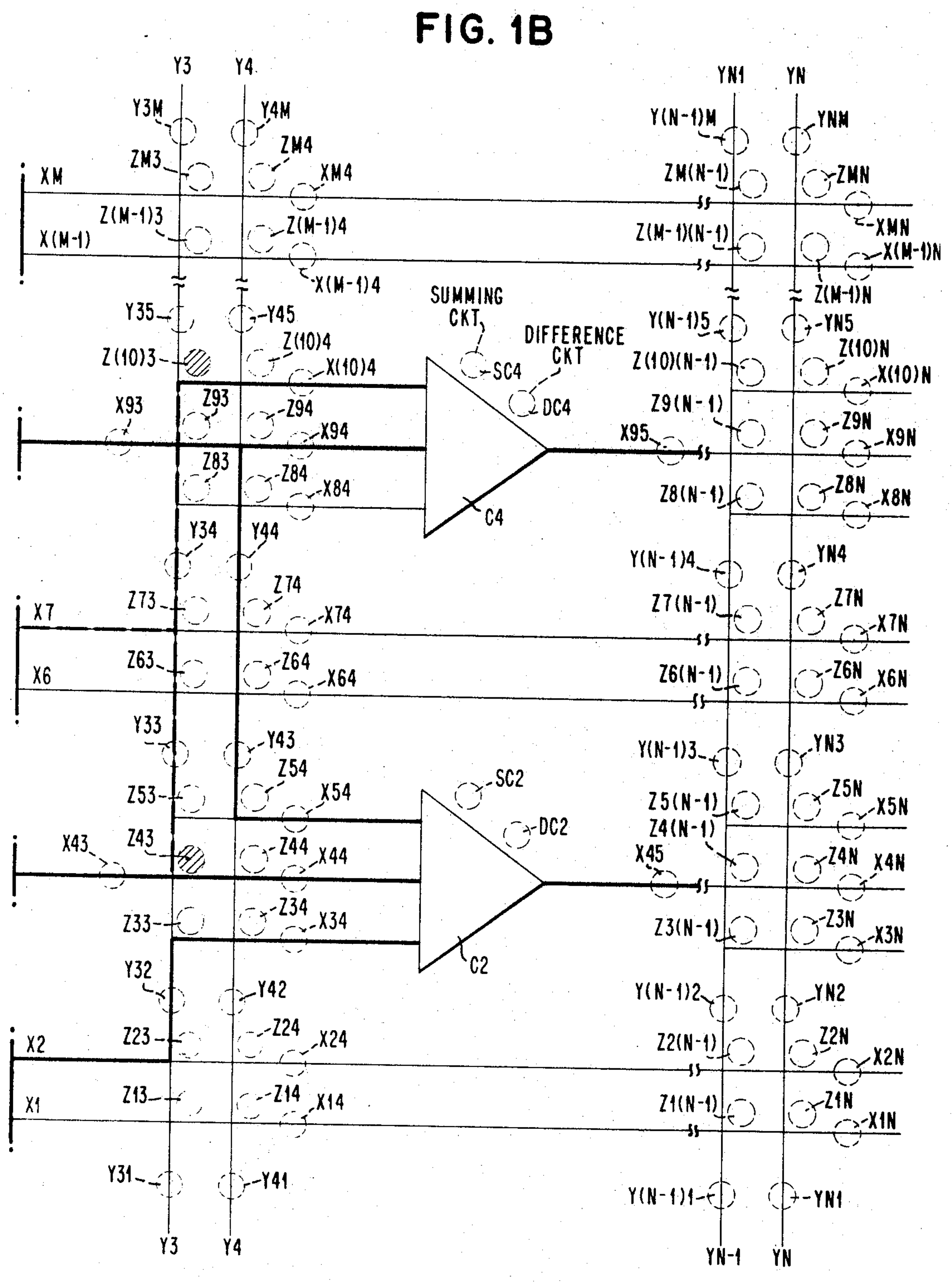

A preliminary step in the wiring of a patch panel is the designing of the circuit to be wired. Ordinarily this is accomplished by drawing the circuit on an ordinary piece of paper or on a piece of graph paper. FIGS. 1A–1B show a portion of a sheet of paper on which there appears a constrained format for drawing an electronic circuit. The format includes a plurality of horizontal lines, designated lines X1–XM, and a plurality of vertical lines, designated lines Y1–YN. The format of FIGS. 1A–1B also includes a plurality of electronic circuits individually designated C1–C4. It is, of course, understood that additional circuits would appear in an expanded format. The circuits C1–C4 may be considered as being capable of performing a single function, such as summing or integrating, or may be considered as being capable of performing a variety of functions. The manner in which these circuits are allowed to perform a variety of functions will be described shortly.

Figures 2, 2A:
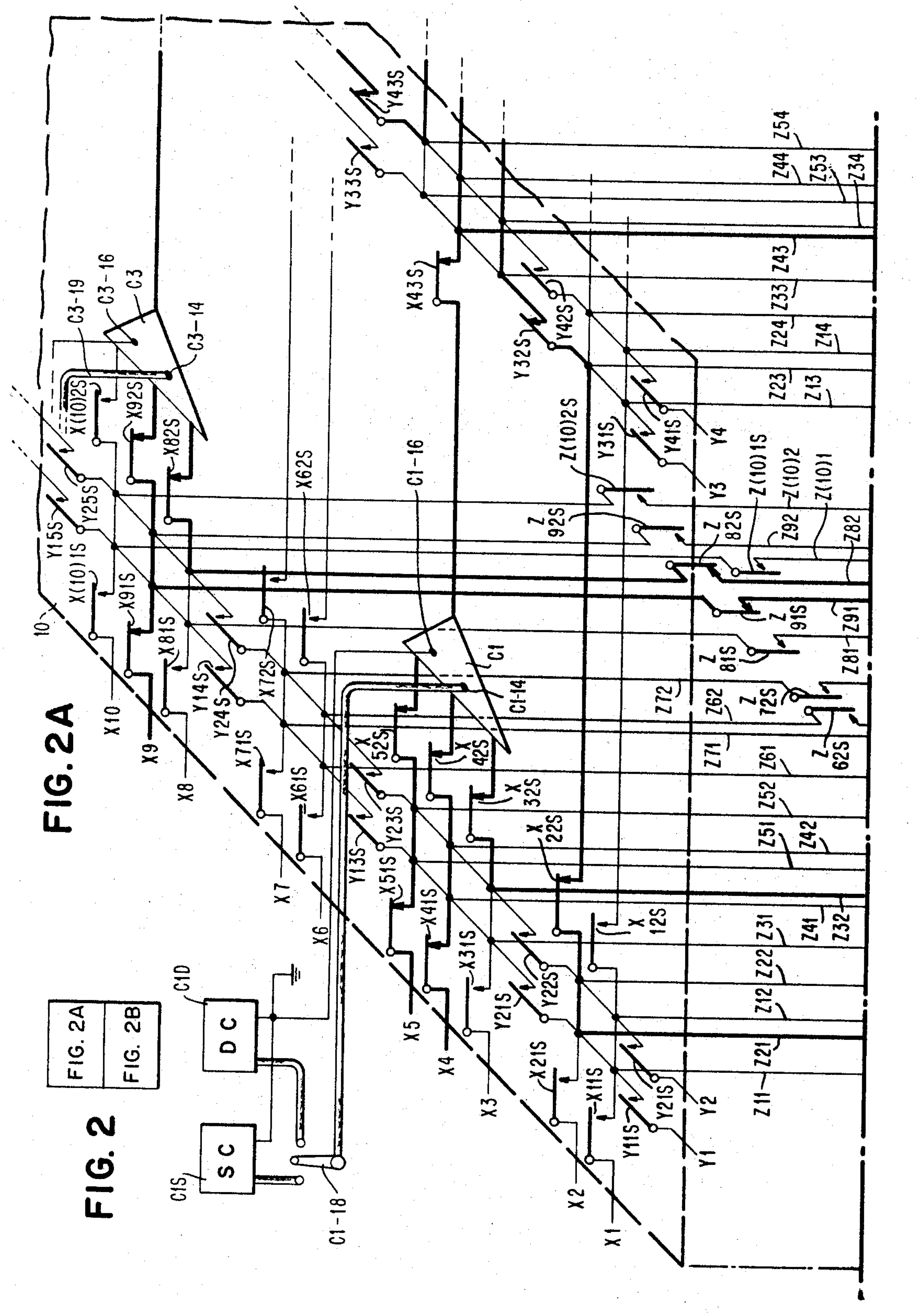
Figure 2B:
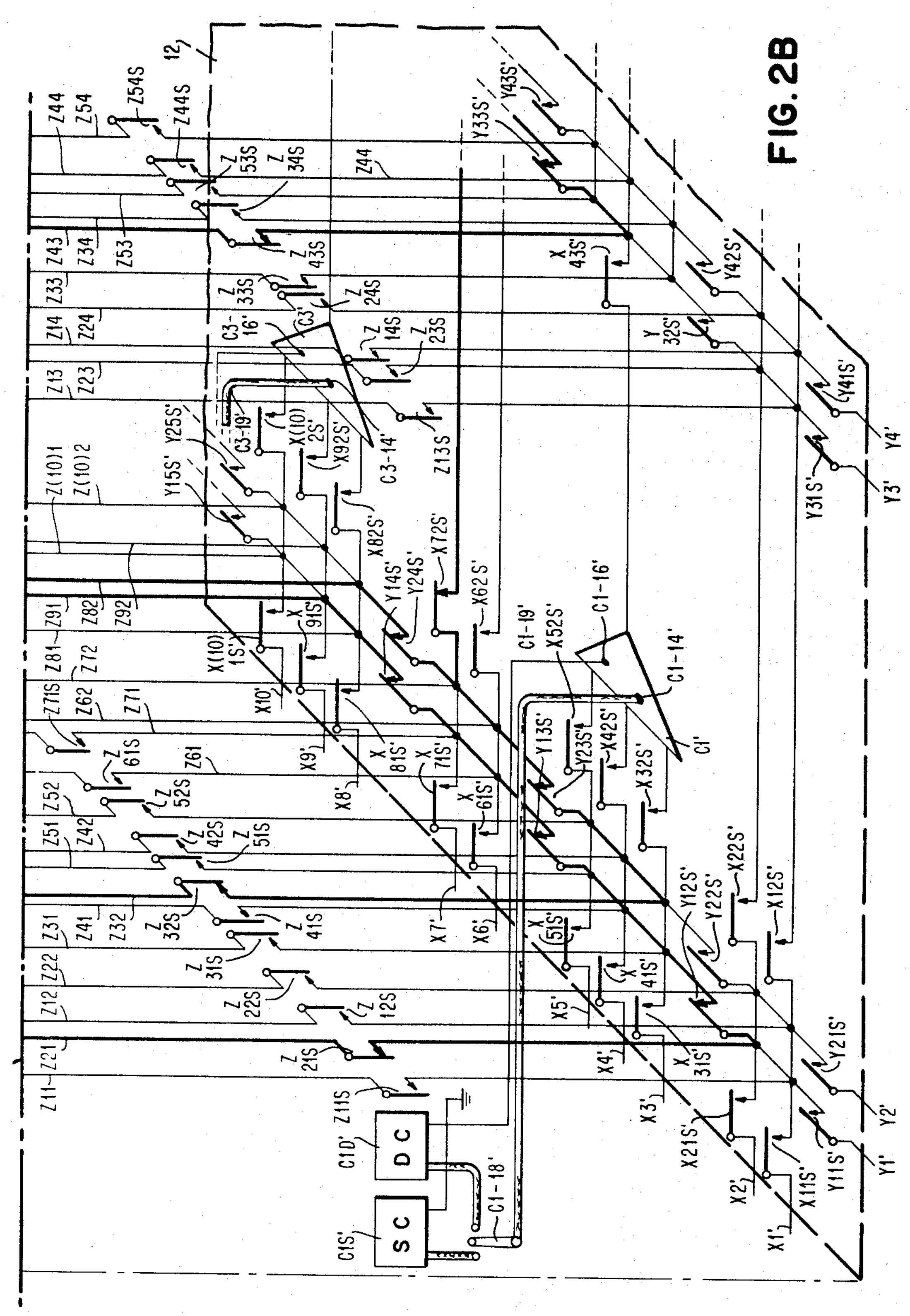

Referring now to FIGS. 2A–2B it is seen that the patch panel includes two planes 10 and 12. Plane 10 is also designated the upper plane and plane 12 the lower plane. There is an X and a Y line in each of the planes 10 and 12 corresponding to each X and Y line in the format of FIGS. 1A–1B (only a portion of planes 10 and 12 is actually shown in FIGS. 2A and 2B). Each junction of an X and a Y line in the upper plane is connected to the corresponding junction in the lower plane by a Z line the designation of which is ZXY, where X is the number of the X line of the junction and Y is a number of the Y line of the junction. Each Z line has a switch therein, the designation of which is the same as that for the corresponding line followed by the letter S. Thus, for example, the switch in line Z23 is designated the Z23S. It is also seen that each of the X lines in the upper plane has a plurality of switches therein, each of which bears the designation XABS, and each of the Y lines in the upper plane has a plurality of switches therein designated YCDS. The letters A and C correspond to the X and Y lines respectively in which the switch appears and the letters B and D represent the position in the line at which the switch appears. For each switch in upper plane 10 there is a corresponding switch in lower plane 12 which switches are designated XABS' and YCDS' where the letters A–D have the same significance indicated above.

Upper plane 10 has a plurality of circuit positions, only two of which, C1 and C3, are shown in FIG. 2A. Terminals C1–14 and C1–16 are associated with circuit position C1. Terminals C1–14 are connected to the center arm of three-position switch C1–18 through cable C1–19. Terminal C1–16 is connected to ground. One set of terminals of switch C1–18 is connected to the active inputs and outputs of summing circuit C1S. The other set of terminals of the switch is conencted to the active inputs and outputs of difference circuit C1D. It is therefore seen that by suitably activating switch C1–18, the circuit C1 may be caused to perform either the summing or the difference function. A summing and a difference circuit are also associated with each of the other circuit positions in the upper and lower planes.

From the above it can be seen that by suitably closing selected ones of the X and Y switches in the plane 10 and by suitably energizing selected ones of the switches such as switch C1–18 a desired circuit configuration may be set up. However, since electrical connections exist between the X and Y lines at each of the junctions in the upper plane, a problem arises when a crossover is required and an electrical connection is not desired. For example, if it is desired to use line Y1 to connect line X2 to line X9 the lines X3–X8 are also crossed. If any of these lines are also being used, a spurious circuit is created. This crossover problem may be avoided by using the Z switches to drop down into lower plane 12 and making the required connection in this plane. For example, in the situation indicated, contacts Z21 and Z91 are closed. The signal on line X2 is then applied through line Z21, line Y1' in lower plane 12, and line Z91 to line X9 in upper plane 10. In this way a crossover with, for example, line X5 in upper plane 10, which may have a circuit connected to it, is avoided.

The discussion so far has indicated how a circuit configuration may be drawn on the constrained format of FIGS. 1A–1B and may then be set into the patch panel of FIGS. 2A–2B by closing appropriate switches therein. The invention is concerned with a system for automatically closing the switches shown in FIGS. 2A–2B as the desired circuit is being drawn on the format sheet of FIGS. 1A–1B. This is accomplished by positioning the format sheet on a board having pressure sensitive switches or transducers positioned at the points indicated by the dotted circles in FIGS. 1A–1B. The switches represented by the dotted circles may for example be elastic diaphragm switches of the type shown in copending application Ser. No. 442,758, Patent No. 3,308,253, issued Mar. 7, 1967, entitled, "Diaphragm Switch," filed Mar. 25, 1965, in behalf of M. Krakinowski, and assigned to the assignee of the instant application. More will be said about these switches later. In FIGS. 1A–1B, 2A–2B, and in the other figures, where pertinent, the physical structure of all of the diagrammatic components in the figures can be in the form of a patch panel, for example, being mounted in the same plane as disclosed in the aforementioned Krakinowski patent. It is seen that in FIGS. 1A–1B there is an X switch and a Y switch corresponding to each of the X and Y switches in plane 10 or plane 12 of FIGS. 2A–2B. There is also a Z switch shown adjacent to each junction of an X and a Y line. The X, Y and Z switches bear the same number and letter designations as the corresponding switches in FIGS. 2A–2B. It is seen that an X switch appears between each group of Y lines and between each group of Y lines and an electrical circuit C1. Similarly, a Y switch appears on a Y line between each group of X lines. Adjacent to each of the circuits C1–C4 are two switches designed the SC (summing circuit) and DC (difference circuit) switches respectively.

*Operation*

The maner in which the system of this invention causes the switches of FIGS. 2A–2B to be closed as the desired circuit is being drawn on a properly positioned format sheet of the type shown in FIGS. 1A–1B can be seen by referring to FIGS. 3A–3E. It will be assumed for this discussion that the pressure sensitive switches being employed are those shown in the beforementioned patent of M. Krakinowski. As indicated in that application, a bank of these switches may be formed by laminating together a substrate having a layer of conductive material thereon, an insulating spacer having a plurality of openings formed therein, and a diaphragm having conductive segments on its underside adjacent to each of the openings in the spacer. A potential is applied to the conductive coating on the substrate and a circuit is completed through a conducting segment on the diaphragm, when the diaphragm is depressed bringing this segment into contact with the conducting layer on the substrate.

Figures 3, 3A:
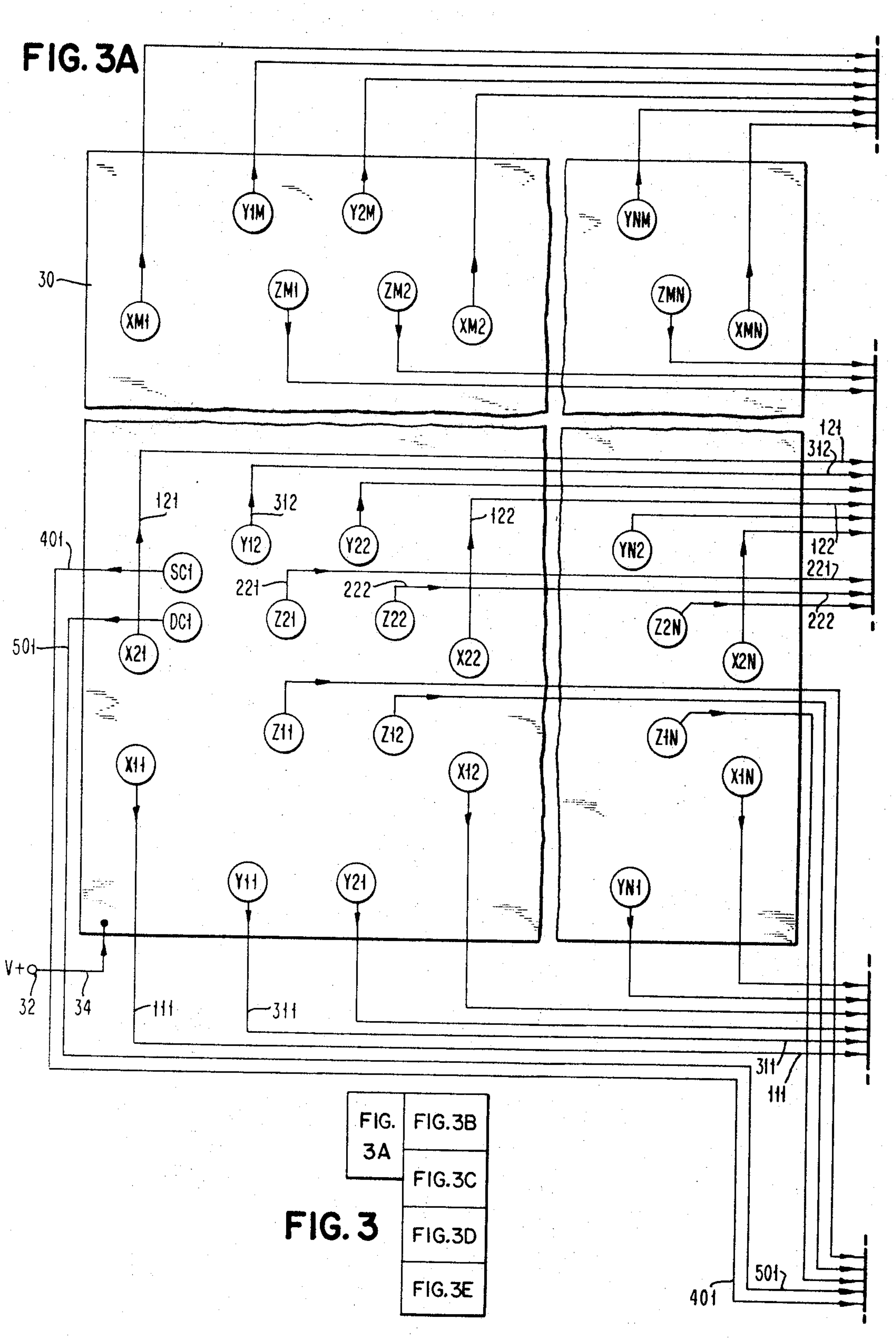
Figure 3B:
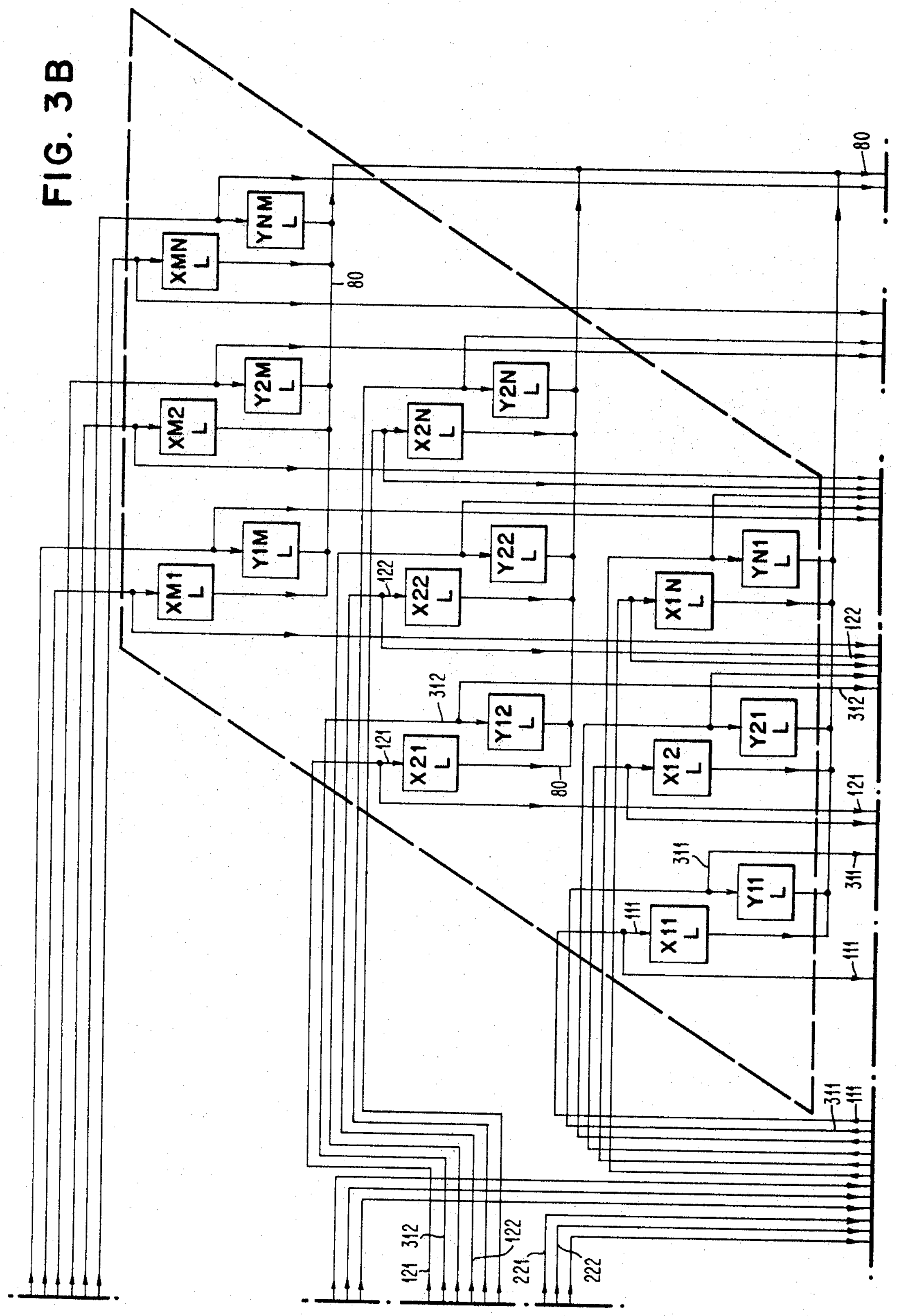
Figure 3C:
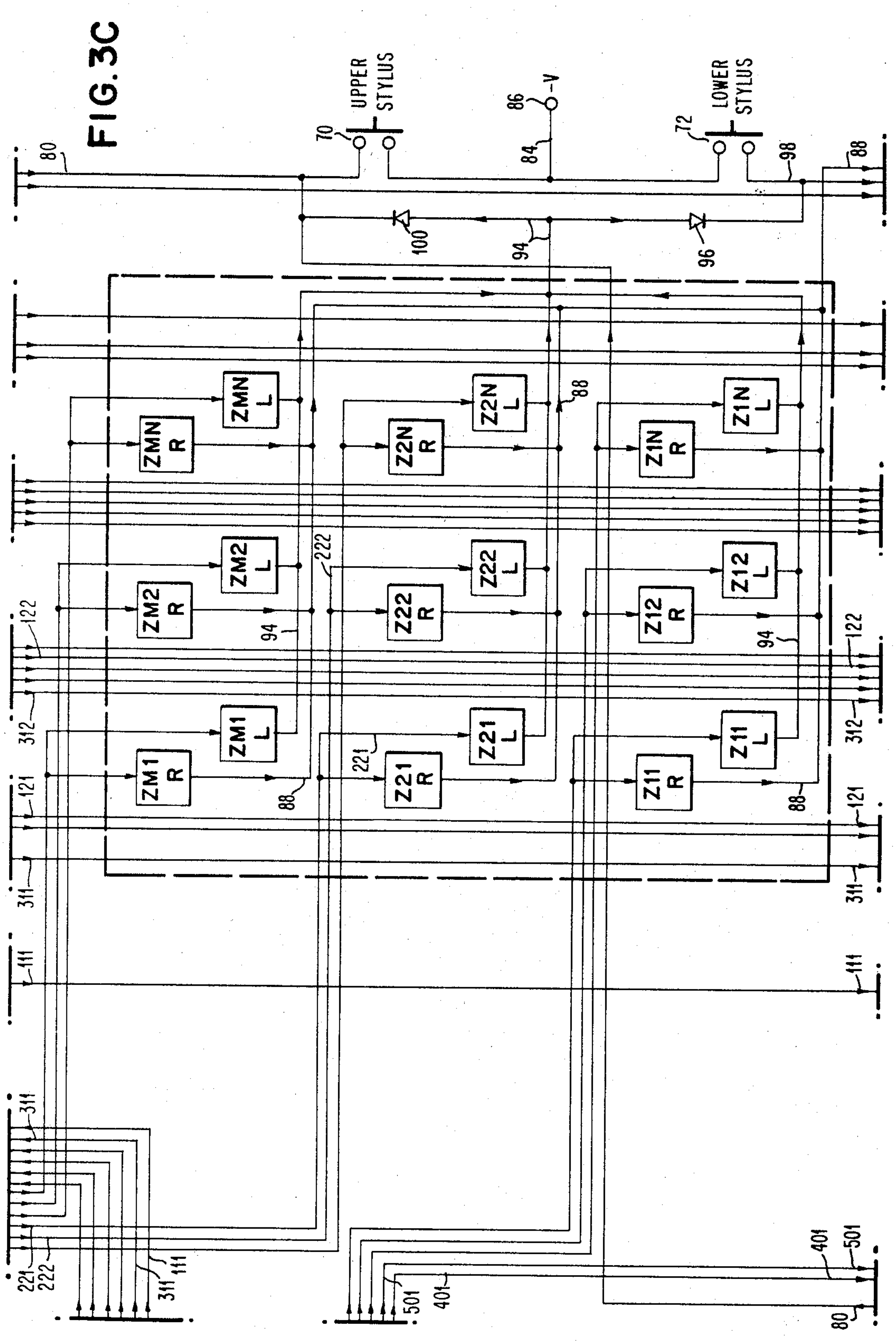
Figure 3D:
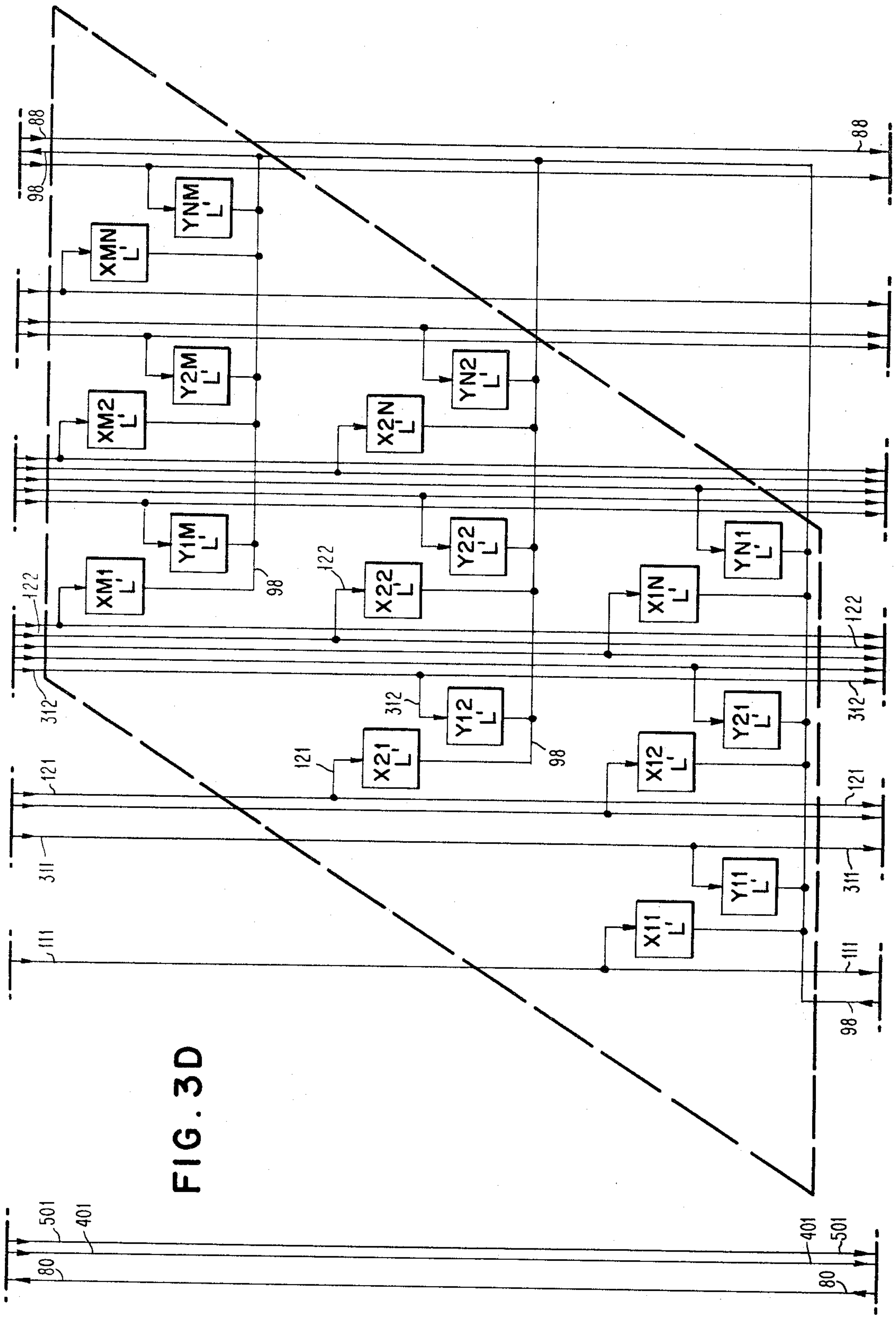
Figure 3E:
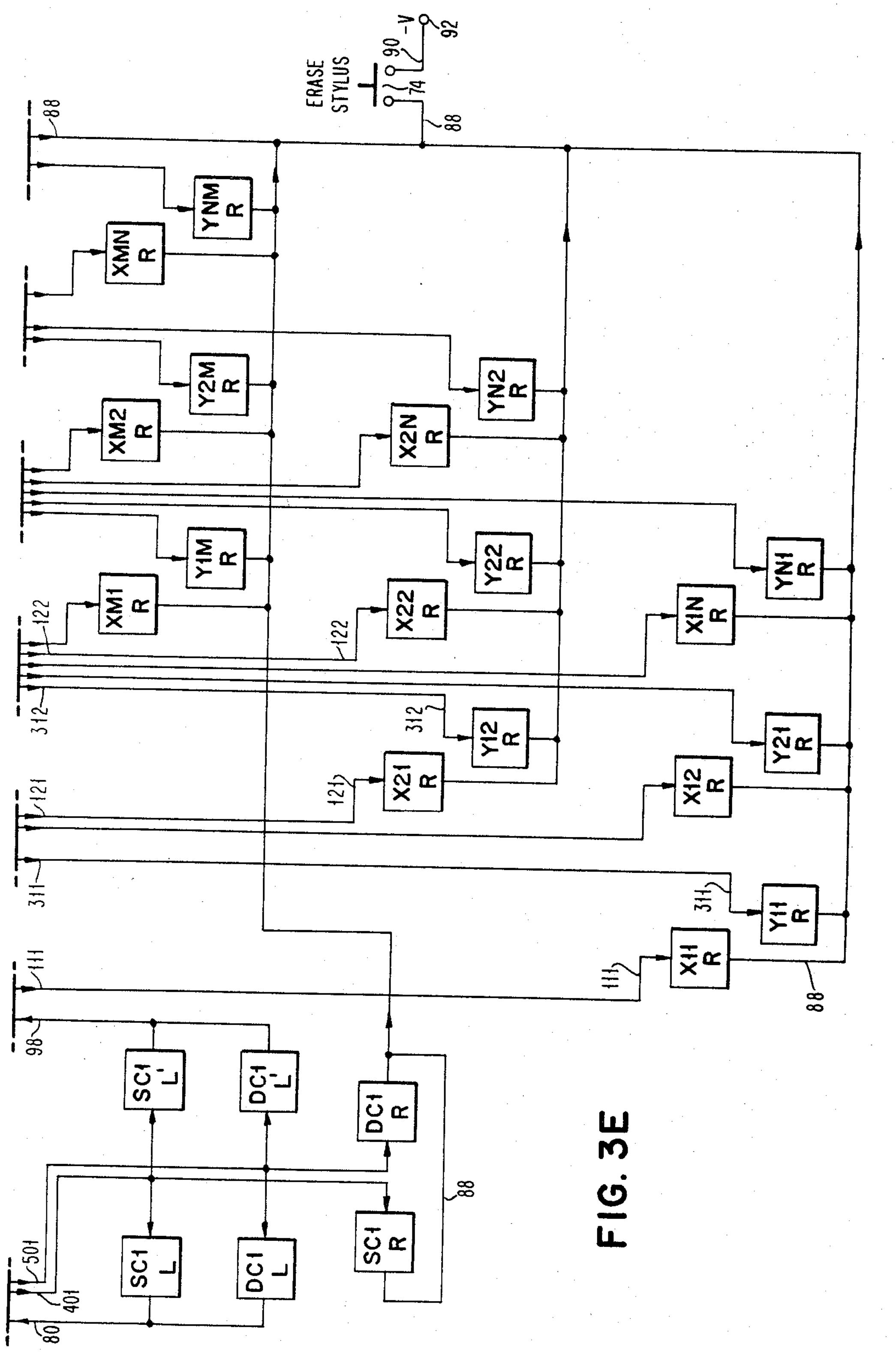

Referring now to FIG. 3A, plane 30 is the conductive coating on the surface of the substrate. A positive potential V is applied to this layer through terminal 32 and line 34. The X, Y, Z, SC, and DC switches shown in FIGS. 1A–1B are each a conducting segment on the underside of the diaphragm. A representative sample of these conducting segments, with appropriate letter designations, is shown on top of conducting surface 30 in FIG. 3A.

Figure 4:
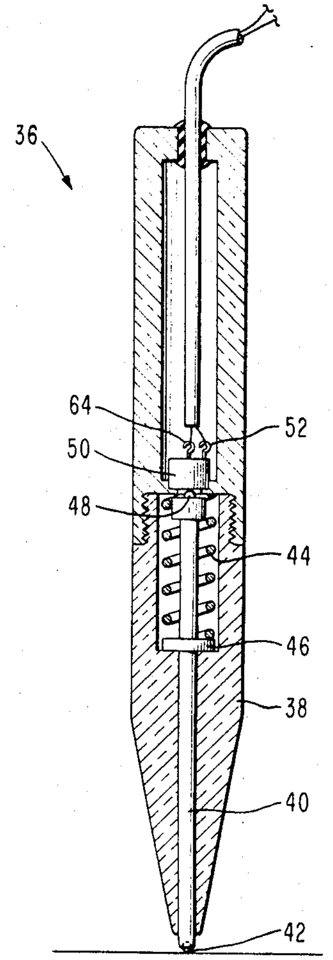
FIG. 4 is a cutaway diagram of a stylus suitable for use in this invention.
Figure 4A:
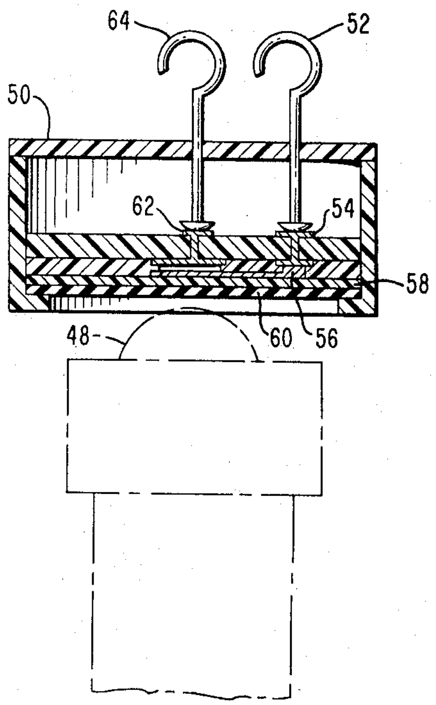
FIG. 4A is a cutaway view of a portion of the stylus shown in FIG. 4.

FIG. 4 shows a stylus 36 which may be used for drawing a desired circuit on the format sheet of FIGS. 1A–1B. Inside its casing 38, the stylus has a ballpoint pen cartridge 40 terminating in a writing ball 42 which permits visible lines to be drawn on the format. Cartridge 40 is normally maintained in a lowered position by compression spring 44 bearing against flange 46 of the cartridge. However, when the cartridge is being used to write, sufficient pressure is applied to the cartridge to overcome the spring tension causing mound 48 on the upper surface of the cartridge to bear against pressure transducer 50. FIG. 4A is a detailed view of pressure transducer 50. From FIG. 4A it is seen that one terminal, 52, of transducer 50 is connected through conducting material 54 to conducting coating 56 on the underside of diaphragm 58. When mound 48 bears against transducer 50 protective layer 60 and diaphragm 58 are deformed to bring conductive coating 56 into contact with conducting material 62. A circuit is in this manner completed between terminal 52 and terminal 64.

Referring again to FIGS. 3C and 3E, it is seen that three styli which may, for example, be of the type shown in FIG. 4, are employed. The first stylus is upper stylus 70 shown in FIG. 3C. This stylus is employed when the circuit being drawn is to be formed in upper plane 10 (FIG. 2A). Lower stylus 72 is employed when the circuit being drawn is to be formed in lower plane 12 (FIG. 2B). An erase stylus 74 (FIG. 3E) is also provided to permit a particular circuit configuration to be removed (i.e., to permit the opening of selected ones of the switches shown in FIGS. 2A–2B).

Referring now to FIGS. 1A–1B it is seen that an exemplary circuit configuration has been shown therein with dark lines. A solid dark line in FIGS. 1A–1B represents connections which are to be made in upper plane 10 (FIG. 2A) and a dotted dark line indicates connections which are to be made in lower plane 12. The Z lines which are to be used are illustrated by hatching the corresponding switch. For purposes of illustration, assume that the circuit designer is at the junction of lines X2 and Y3, is using upper plane stylus 70 (FIG. 3C), and is drawing from right to left. As the designer proceeds in this direction along line X2, the stylus eventually crosses switch X22. Referring to FIG. 3A, it is seen that when the conducting segment for switch X22 is brought into contact with common conducing surface 30, a circuit is completed from the source of positive potential connected to terminal 32, through line 34, conducting surface 30, conducting segment X22, line 122, latch X22L (FIG. 3B), upper common line 80, the switch of upper stylus 70 which is closed at this time, and line 84 to terminal 86 which is connected to a source of negative potential. Latch X22L is in this manner energized.

For purposes of the present discussion, it may be assumed that latch X22L and the other latches shown in FIG. 3, viz. FIGS. 3B–3E are latching relays of a type well known in the art. Once these relays have been energized, causing the contacts thereof to be closed, the contacts remain closed even though the original energizing signal is removed. The energizing of latch X22L causes switch X22S (FIG. 2A), which is assumed to be a contact of the latch, to be closed. The desired connection in the patch panel is in this manner established.

Assume that the circuit designer continues drawing to the left along line X2 until he reaches, and crosses over, the switch position X21. When this occurs, a circuit is again established from the source of positive potential through conducing surface 30 (FIG. 3A), conducting segment X21, line 121, latch X21L (FIG. 3B), common line 80, upper-stylus switch 70, and line 84 to the source of negative potential. The signal through latch X21L causes contact X21S (FIG. 2A) to be latched.

Assume now that the circuit designer decides that he has made a mistake in extending the line to the switch X21 and that he, in fact, wishes for the line to stop at line Y1. Under these conditions, he puts down upper-stylus 70 and picks up erase-stylus 74. Erase-stylus 74 may be identical to that shown in FIG. 4 except that an eraser is substituted for the ball 42. The designer then proceeds to erase the line drawn over switch point X21 and in so doing causes the switch 74 (FIG. 3E) of the erase-stylus to be closed. He also causes conducting segment X21 to again be brought into contact with conducting surface 30. When this occurs, a circuit is completed from the source of positive potential through conducting surface 30, conducting segment X21, line 121, latch X21R (FIG. 3E), line 88, closed erase-stylus switch 74 and line 90 to terminal 92 which is connected to a source of negative potential. The resulting signal through relay coil X22R causes latch X21L to be released, permitting contact X21S to be opened. The erroneously made connection is, in this manner, eliminated.

Tht circuit designer now wishes to make a connection from the X2 line to the X9 line using the Y1 line to do so. However, he observes that the Y1 line crosses over both the X4 and X5 lines, each of which has been previously used in the circuit. Therefore, in order to eliminate spurious connections, the X2 and X9 lines must be connected in lower plane 12 (FIG. 2B). To accomplish this, the circuit designer picks up either the upper stylus or the lower stylus and touches the switch point Z21 (FIG. 1A) with it. Since the next line to be drawn is going to be in lower plane 12, assume that it is the lower stylus which is picked up and used to touch switch point Z21 at this time. Lower-stylus switch 72 (FIG. 3C) is therefore closed at this time. The touching of the Z21 switch point also causes conducting segment Z21 (FIG. 3A) to be brought into contact with conducting surface 30. This results in a positive potential from terminal 32 being applied through conducting segment Z21, line 221, latch Z21L, common line 94, diode 96, line 98, lower stylus switch 72, and line 84 to negative potential terminal 86. The signal through latch Z21L causes the corresponding switch contact Z21S (FIG. 2B) to be closed and latched, thereby interconnecting the upper and lower planes at this point.

The circuit designer then proceeds upward with the lower stylus on line Y1 and in so doing crosses over switch point Y12 (FIG. 1A). When the lower stylus passes over switch point Y12, a circuit is completed from the source of positive potential through conducting surface 30, conducting segment Y12, line 312, latch Y12L' (FIG. 3D), common line 98, lower-stylus switch 72, and line 84 to negative potential terminal 86. The signal through latch Y12L' causes contact Y12S' (FIG. 2B) to be closed and latched.

As the circuit designer proceeds up line Y12, contacts Y13S' and Y14S' (FIG. 2B) are closed in a manner identical to that described above for contact Y12S'. When line X9 is reached, the circuit designer touches the switch point Z91 (FIG. 1A) causing the contact Z91S to be closed in a manner identical to that previously described for the contact Z21S, thereby connecting the lower plane to the upper plane at the junction point of lines X9 and Y1. The circuit designer then lays down the lower-stylus and picks up the upper stylus to draw, on the X9 line, a line from the left edge of the sheet to the circuit C3. In doing this, he crosses switch points X91 and X92. The crossing of switch points X91 and X92 cause corresponding latches to be energized, resulting in the closing of switches X91S and X92S (FIG. 2B).

Assume for the sake of illustration that when the circuit designer is writing with the uper stylus he accidentally touches switch point Z22. When this happens, a circuit is completed from the source of positive potential through conducting surface 30 (FIG. 3A), conducting segment Z22, line 222, latch Z22L (FIG. 3C), common line 94, diode 100, common line 80, closed upper stylus switch 70, and line 84 to negative potential terminal 86. A signal through latch Z22L causes contact Z22S (FIG. 2B) to be closed. Assume now that the circuit designer realizes his error and decides to erase the Z22 connection. To accomplish this, he lays down the upper stylus and picks up the erase-stylus. He then passes the erase-stylus over switch point Z22, causing a circuit to be completed from the source of positive potential through conducting surface 30, conducting segment Z22, line 222, erase coil Z22R (FIG. 3C), common erase line 88, closed erase-stylus switch 74 (FIG. 3E), and line 90 to negative potential terminal 92. The signal through coil Z22R is effective to unlatch the closed switch Z22S (FIG. 2B).

The description so far has considered how an X contact in the upper plane is closed and released, how a Y contact in the lower plane is closed, and how a Z contact is closed and released. To illustrate how a Y contact in the upper plane is closed and released, assume that the upper stylus is erroneously passed over the switch point Y11. When this occurs, a circuit is completed from the source of positive potential through conducting surface 30, conducting segment Y11, line 311, latch Y11L (FIG. 3B), common line 80, closed upper-stylus switch 70 and common line 84 to negative potential terminal 86. The signal through latch Y11L causes the corresponding contact Y11S (FIG. 2A) to be closed and latched. To release this contact, the switch point Y11 is passed over by erase-stylus 74. When this occurs, the positive potential signal applied to line 311 is passed through coil Y11R (FIG. 3E), common erase line 88, closed erase-stylus switch 74, and line 90 to negative potential terminal 92. The signal through erase coil Y11R causes contact Y11S (FIG. 2A) to be released.

To illustrate the closing and opening of an X contact in the lower plane, assume that switch point X11 is erroneously passed over by the lower stylus. When this occurs, a circuit is completed from positive potential terminal 32 through conducting signal X11, line 111, latch X11L' (FIG. 3D), common line 98, closed lower-stylus switch 72, and line 84 to negative potential terminal 86. The signal through latch X11L' causes contact X11S' (FIG. 2B) to be closed and latched. This contact may be opened by passing over switch point X11 with the erase-stylus. When this is done, a circuit is completed from positive potential terminal 32 through conducting segment X11, line 111, erase coil X11R (FIG. 3E), common erase-line 88, closed erase-stylus switch 74, and line 90 to negative potential terminal 92. The signal through erase coil X11R causes contact X11S′ to be unlatched.

From the above, it is seen that when one of the X or Y switch points shown in FIGS. 1A–1B or FIG. 3A is passed over by the upper stylus, a corresponding latch in the upper plane is energized, causing a corresponding contact in upper plane 10 (FIG. 2A) to be closed and latched. Similarly, when one of the X or Y switch points is passed over by the lower stylus, the corresponding lower stylus latch is energized, causing the corresponding X or Y switch in lower plane 12 (FIG. 2B) to be closed and latched. A Z switch point may be passed over by either the upper stylus or the lower stylus. In either case, a circuit is completed through the corresponding Z latch, causing the corresponding Z switch to be closed. The passing over of an X or Y switch point by the erase-stylus causes the corresponding contact in either the upper or the lower plane to be unlatched and the passing over of a Z switch point by the erase-stylus causes the corresponding Z switch to be unlatched.

Assume now that all the lines have been drawn in the circuit of FIG. 1A–1B and a decision is now made that circuit C1 is to be a summing circuit. From the inputs and outputs to C1 in FIG. 1A, it is seen that this circuit is in the upper plane. The circuit designer therefore uses the upper stylus to pass over switch point SC1. When switch point SC1 is passed over, a circuit is completed from positive potential terminal 32 (FIG. 3A) through conducting surface 30, conducting segment SC1, line 401, latch SC1L (FIG. 3E), common upper-stylus line 80, closed upper-stylus switch 70, and line 84 to negative potential terminal 86. The signal through the SC1L latch causes the arm of switch C1–18 (FIG. 2A) to be brought into contact with the terminals leading to summing circuit C1S. Switch C1–18 remains latched in this position until released. Summing circuit C1S is in this way connected in as the circuit C1.

Assume now, for the sake of illustration, that an erroneous decision was initially made that the circuit C1 was to be a difference circuit in the lower plane. As a first step in performing this operation, the designer would pass the lower stylus over switch point DC1. When this is done, a circuit is completed from positive potential terminal 32, through conducting surface 30, conducting segment DC1, line 501, latch DC1L′ (FIG. 3E), lower-plane common line 98, closed lower-stylus switch 72, and line 84 to negative potential terminal 86. The energizing of latch DC1L′ causes the arm of switch C1–18′ (FIG. 2B) to be transferred into contact with the terminals leading to difference circuit C1D′. This connects the difference circuit C1D′ into the circuit C1′. When the error is realized, the circuit designer passes over the switch point DC1 with the erase-stylus. When this is done, a circuit is completed from positive potential terminal 32 through conducting surface 30, conducting segment DC1, line 501, coil DC1R (FIG. 3E), common line 88, closed erase-stylus switch 74, and line 90 to negative potential terminal 92. The signal through erase coil DC1R causes switch C1–18′ to be returned to its neutral position.

While for purposes of illustration, a summing and a difference circuit have been shown as being available for each of the C circuits in the upper plane and each of the C′ circuits in the lower plane, it is apparent that a queue of each of these circuits could be provided and suitable circuitry provided to connect the next circuit of the proper type to an indicated C or C′ circuit each time a circuit of the indicated type is required. It is also apparent that other circuits such as integrators, differentiators, amplifiers, etc. could be either substituted for the summing and difference circuits shown or could be provided as other alternatives. While it might not be practical to provide a large number of circuit alternatives for the embodiment of the invention shown in the figures, where a queue type embodiment is provided, a large number of circuit alternatives becomes practical. It is also apparent that in certain logical situations, only a single type of circuit need be used and, in these situations, the switch points for circuit selection and the associated circuitry may be eliminated.

In the discussion so far, it has been assumed that sufficient pressure is applied to the format sheet shown in FIGS. 1A–1B to cause the desired connections to be made and that the circuit is functioning properly. FIG. 1A illustrates one way in which the effecting of a desired connection may easily be verified. The board on which the format sheet is placed is made either transparent or semi-transparent and a source of light (for example, X11N, Y11N) is placed under each X and each Y line segment. A source of light (for example, Z11N, SC1N, DC1N) is also placed under each Z, SC, and DC switch point. When one of the latches shown in FIGS. 3A–3E is energized, the corresponding light source is also energized, either through the contacts shown in FIGS. 2A–2B or through a separate set of contacts on the latches which contacts are provided for this purpose, thereby providing a visual verification on the circuit operation. The light sources may, for example, be incandescent lamps, solid state diodes, neons, or shutter controlled lamps. When a connection is erased, causing a latch to be released, the corresponding contacts open permitting the corresponding lamp to be extinguished. Where desired, a separate lamp, for example, a different color neon may be used to verify connections in the different planes.

Another problem which has not yet been considered is what happens when it is desired to remove a circuit from the patch panel so that a new circuit may be wired up. One way of accomplishing this is, of course, to pass over each switch point involved in the circuit with the erase stylus. This, however, would be a laborous procedure for large circuits, and a preferred procedure would be to provide a reset switch point or button which could be pressed by the erase stylus to cause a positive potential to be applied to each of the release coils. Since the erase stylus is also closed by this procedure, a circuit is completed through each of the release coils causing all switches of the patch panel (FIGS. 2A–2B) to be opened.

In the discussion so far, it has also been assumed that diaphragm switches are used as the pressure-sensitive transducers and that latching relays are used as the circuit latches. It is apparent that any form of pressure-sensitive transducer may be employed and that any one of a variety of electronic latches may be substituted for the electromechanical relay latches. Similarly, the contacts or switches shown in FIGS. 2A–2B may, in fact, be electronic switches.

While in the discussion so far, it has also been assumed that pressure-sensitive devices are used for detecting the circuit being drawn and latching devices are used for setting up the patch-panel circuit, it is apparent that if suitable pressure-sensitive latching devices are available, both of these operations may be performed by a single element.

Another possible modification on the circuit shown in the drawings is to provide a coding circuit for coding the closures of the pressure-sensitive devices. This coded information could then be stored, for example, on magnetic tape. The tape could then be read, decoded and used to set up the latches at some subsequent time.

It is also apparent that the upper and lower styli may, in fact, be opposite ends of the same stylus and that cartridges containing different color ink may be employed to assist the circuit designer in recognizing which stylus he is using.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for semiautomatically generating a desired patched circuit wiring arrangement on a patch panel as a corresponding circuit wiring diagram is drawn by graphically tracing selected portions of desired lines on a format sheet with tracing implement means comprising:
- a plurality of relay means;
- means responsive to the tracing of said selected portions of lines for selectively activating said relay means thereby providing said patched circuit wiring arrangement;
- said patch panel comprising two planes including wiring;
- means on said format sheet for determining whether the portions of the lines being traced form connections for the wiring in one or the other of said planes; and
- means for interconnecting the connected wiring in said two planes in accordance with said diagram to form said patched circuit wiring arrangement.

2. A system of the type described in claim 1 wherein said means for selectively activating said relay means includes a plurality of switching means, said switching means being positioned to be selectively energized as said desired wiring diagram is being drawn.

3. A system of the type described in claim 2 wherein said switching means are pressure sensitive transducers.

4. A system of the type described in claim 3 wherein said pressure sensitive transducers are diaphragm switches.

5. A system of the type described in claim 1 wherein a portion of the drawn wiring diagram may be erased;
- and further including means responsive to the erasing of a portion of the wiring diagram for deactivating portions of said relay means which were activated when said portions of the wiring diagram was drawn.

6. A system of the type described in claim 5 wherein said tracing implement means includes a first stylus which is used for drawing portions of said wiring diagram to form a corresponding connected wiring in one of said planes and a second stylus used to draw portions of said wiring diagram to form a corresponding connected wiring in the other of said planes.

7. A system of the type described in claim 1 including a plurality of circuit elements in said patch panel wiring arrangement.

8. A system of the type described in claim 7 including:
- means on said format sheet for indicating the functions to be performed by said circuit elements;
- and means responsive to the drawing of said diagram to include said indicating means for permitting each circuit element to perform its assigned function.

9. A system of the type described in claim 1 including means for verifying that a selected relay means has been activated.

10. A system for semiautomatically generating a desired patched circuit wiring arrangement on a patch panel comprising:
- a format sheet on which a wiring circuit diagram corresponding to said circuit wiring arrangement is drawn by graphically tracing selected portions of lines thereon with tracing implement means;
- a plurality of switching means positioned to be selectively energized in response to the tracing of said portions of said lines to produce a pattern of output signals in accordance with said tracing of said portions;
- storage means responsive to said output signals for producing stored contents; and
- means controlled by said contents for forming said desired patched circuit wiring arrangement on said patch panel.

11. A system of the type described in claim 10 wherein said storage means are a plurality of relay means, there being at least one relay means for each of said switching means.

12. A system of the type described in claim 10 wherein said patch panel is formed in a plurality of planes;
- wherein said storage means includes, for each of said switching means which is energized when portions of said wiring diagram in one of said planes is being drawn, a relay means for each of said planes;
- and including means on said format sheet for indicating the plane in which a given portion of the wiring of said patch panel is to be connected;
- means responsive to an energized switching means for activating a selected one of said relay means;
- and means for selectively interconnecting the connected wiring in said planes.

13. A system of the type described in claim 12 wherein each of said planes includes a plurality of lines having a plurality of junctions therebetween, said interconnecting means includes a switching means for each junction of two lines in said planes of said patch panel;
- an interconnecting relay means operated in response to the energizing of each of the above mentioned switching means;
- and means controlled by each of said interconnecting relay means for effecting the desired interconnecting of said planes.

14. A system of the type described in claim 12 wherein said tracing implement means includes a stylus for each of said planes;
- a switch associated with each of said styli;
- means responsive to the tracing with a given stylus for energizing the corresponding switch;
- and means responsive to the energizing of said stylus switch for permitting only said relay means for the plane corresponding thereto to be energized.

15. A system of the type described in claim 14 wherein the means for interconnecting two of said planes is operative only if the stylus switch for one of said planes is energized.

16. A system of the type described in claim 12 including a relay means release means for each of said switching means;
- an erase switch;
- and means responsive to the energizing of said erase switch and one of said switching means for releasing all relay means associated with said switching means.

17. A system of the type described in claim 12 including a plurality of circuit elements in said patch panel.

18. A system of the type described in claim 12 wherein there is a like arrangement of circuit element positions on said format sheet and in each plane of said patch panel;
- including means on said format sheet for indicating the function to be performed by a given circuit element position;
- and the plane in which a circuit element is to be connected into said circuit element position;
- and means responsive to the tracing of connections associated with said indicating means for connecting a circuit for performing the indicated function in the indicated plane.

References Cited

UNITED STATES PATENTS 3,127,588 3/1964 Harmon ---------- 340—146.3

ROBERT K. SCHAEFER, *Primary Examiner.*

M. GINSBURG, *Assistant Examiner.*